Nov. 27, 1951     D. J. SIKORRA     2,576,647
REGULATING SYSTEM UTILIZING A NONLINEAR
RESONANT CURRENT LIMITER
Filed Oct. 5, 1949

LINE VOLTS

LOAD CURRENT

Inventor
Daniel J. Sikorra
by Didier Journeaux
Attorneys

Patented Nov. 27, 1951

2,576,647

UNITED STATES PATENT OFFICE 2,576,647

REGULATING SYSTEM UTILIZING A NON-LINEAR RESONANT CURRENT LIMITER

Daniel J. Sikorra, Milwaukee, Wis., assignor to Allis-Chalmers Manufacturing Company, Milwaukee, Wis., a corporation of Delaware Application October 5, 1949, Serial No. 119,628

7 Claims. (Cl. 322—25)

This invention relates in general to electric regulating systems and in particular to regulating systems utilizing current limiting devices.

In prior regulating systems of this type, a current limiting device was sometimes employed to modify or overcome a controlling effect supplied to the regulating system by a regulator responsive to variations in the regulated voltage or other regulated quantity from a predetermined value. In most of such systems, if the regulated voltage was below the desired value, the regulator supplied a controlling effect of increasing magnitude to the system, even though such controlling effect increased the flow of current in the regulated circuit above a critical value. Such systems have the disadvantage that, owing to the increasing magnitude of the control voltage tending to increase the flow of current in the regulated circuit, the current limiting device must produce a very large voltage before any appreciable current limiting action is apparent.

These disadvantages can be overcome by providing means for limiting the amplitude of the control voltage applied to the regulating equipment in a direction tending to increase the flow of current in the regulated circuit, thereby limiting the voltage which the current limiting device must overcome and materially increasing the current limiting accuracy.

A current limiter of the nonlinear resonant circuit produces very quick and accurate response to excess current, especially when used in conjunction with a regulator having a control voltage of limited amplitude.

It is therefore an object of this invention to provide a regulating system utilizing a current limiting device associated with a regulator which limits the maximum amplitude of a control voltage tending to increase the current in the regulated circuit.

Figure 1:
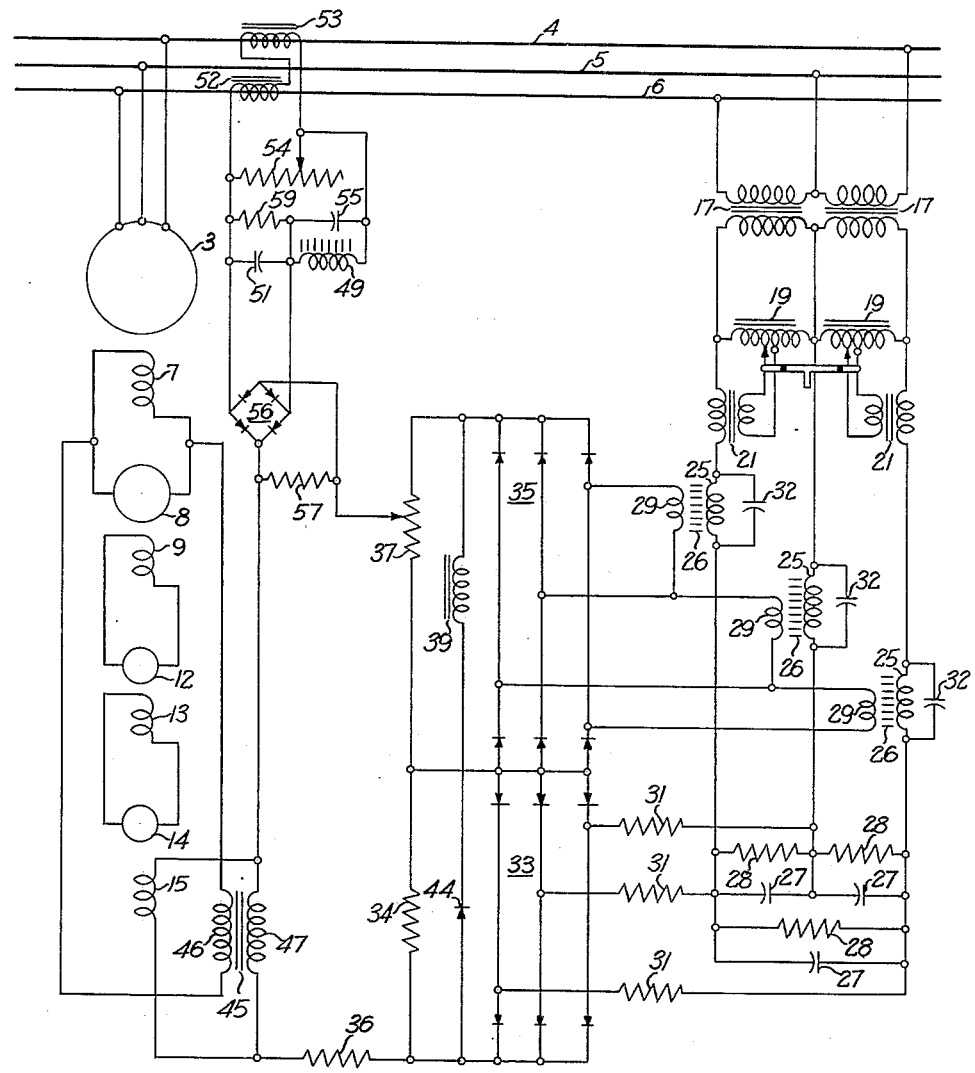
Figure 2:
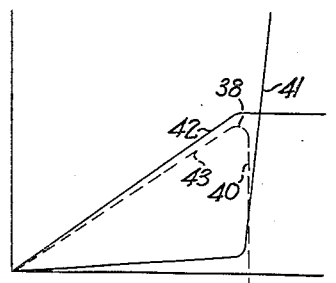
Figure 3:
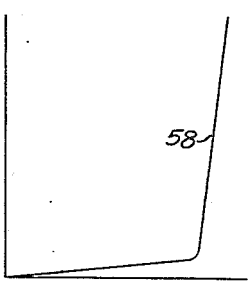

Objects and advantages other than those stated above will be apparent from the following description when read in connection with the accompanying drawing, in which:

Fig. 1 is a diagrammatic representation of a regulating system embodying the apparatus and circuits of the invention; and Figs. 2 and 3 are graphs, the curves of which represent the relationships between the voltages of the nonlinear resonant circuits of the embodiment illustrated in Fig. 1.

Referring to Fig. 1, the invention is shown as applied to the regulation of a dynamoelectric machine 3 which supplies an alternating current load circuit represented by conductors 4, 5 and 6. Machine 3 is provided with a field winding 7, the energization of which is supplied by a main exciter 8. Main exciter 8 is provided with a field winding 9 which is energized by an exciter generator 12. The energization of field winding 13 of exciter 12 is supplied by an exciter generator 14. Field winding 15 of exciter 14 is connected to be responsive to the voltage of machine 3 and to the current in conductors 4, 5 and 6, to generally maintain the voltage of machine 3 at a substantially constant value, but also to substantially prevent the current in load conductors 4, 5 and 6 from exceeding a critical value.

Connected to be responsive to variations in the voltage of machine 3 from a predetermined value is a regulator which supplies to field winding 15 a control voltage having a polarity and magnitude dependent upon the direction and magnitude of the variations in the voltage of machine 3. The regulator may be of any suitable type, but is preferably of the kind disclosed and claimed in my copending application, Serial No. 114,751, filed September 9, 1949. Briefly this regulator comprises a plurality of nonlinear resonant circuits, each circuit comprising the primary winding 25 of a saturable transformer 26 connected in series with a capacitor 27. Each winding 25 may be shunted by a small capacitor 32 for the purpose of sharpening the point of resonance of the nonlinear circuits. One such first nonlinear circuit is provided in each phase of the system and the circuits are energized by a measure of the voltage of machine 3 through transformers 17 connected to conductors 4, 5 and 6, autotransformers 19 and booster transformers 21.

Each saturable transformer 26 is provided with a secondary winding 29 for furnishing a voltage which is proportional to the voltage of its associated primary winding 25.

Capacitors 27 are connected to a resistor 34 through voltage reducing resistors 31 and a three phase rectifier 33 to impress on resistor 34 a rectified voltage proportional to the average of the voltages of capacitors 27. A similar three phase rectifier 35 is connected across secondary windings 29 of transformers 26 to produce another rectified voltage which is proportional to the average of the voltages of windings 29 and which is impressed on a resistor 37. Because of the connections of rectifiers 33 and 35, the voltage of resistor 34 opposes the voltage of resistor 37. Field winding 15 of exciter 14 is connected across resistor 34 and an adjustable portion of resistor 37 through an adjustable tap on resistor 37 and is thereby directionally energized by a control voltage equal to the difference between the voltages of resistor 34 and of a portion of resistor 37. A rectifier 44 and a reactor 39 may be connected across the non-common terminals of resistors 34 and 37 to provide means for limiting the amplitude of the control voltage applied to field winding 15 in a direction tending to decrease the excitation of machine 3.

A resistor 36 in the circuit of winding 15 serves to lower the time constant of this circuit and thereby accelerate the response of exciter 14 to variations in the differential voltage. Any suitable damping means, such as a transformer 45 having a primary winding 46 connected across exciter 8 and a secondary winding 47 connected across field winding 15, may be provided to prevent hunting of the system.

In accordance with this invention, means are provided for limiting the excitation of machine 3 to substantially prevent the flow of current in conductors 4, 5 and 6 from exceeding a critical value. Such means include a second nonlinear resonant circuit comprising a saturable reactor 49 connected in series with a capacitor 51. A small capacitor 55 may be connected across reactor 49 to sharpen the point of resonance of this nonlinear circuit. Two current transformers 52 and 53, connected to any two of the conductors 4, 5 and 6, and supplying any suitable variable impedance means such as a resistor 54, variably energize the second nonlinear circuit with a voltage which is a measure of the current in load conductors 4, 5 and 6. A direct current voltage proportional to the voltage of capacitor 51 is impressed on a resistor 57 from a full wave rectifier 56 of any suitable type connected to the terminals of capacitor 51. Resistor 57 is connected in circuit with field winding 15 between the adjustable tap of resistor 37 and one terminal of winding 15. Winding 15 therefore constitutes control means responsive to the control voltage supplied from resistors 34 and 37 and to a rectified voltage proportional to the voltage of capacitor 51 for controlling the excitation of machine 3.

Curve 41 of Fig. 2 represents the variation of the portion of the rectified voltage of capacitors 27 which is impressed on resistor 34, in function of variation of the voltage of machine 3. Curve 42 likewise represents the portion of the rectified voltage of windings 29 which appears across the portion of resistor 37 adjacent resistor 34. Because of the nonlinearity of each of the nonlinear circuits comprising a winding 25 and a capacitor 27, at low line voltages the major part of the voltage proportional to the voltage of machine 3, which is impressed on windings 25 and capacitors 27, is absorbed by windings 25. Hence, as the voltage of machine 3 is increased from zero, the voltage of windings 25 increases steadily as shown by curve 42 of Fig. 2, while the voltage of capacitor 27 remains at a low value, as shown by the lower portion of curve 41, and differs sufficiently little from the value zero as to be without appreciable effect on the operation of the system.

However, at a predetermined value of the voltage of machine 3, the nonlinear circuits become resonant. At this predetermined value, the voltage of capacitors 27 suddenly increases, as shown by the steep portion of curve 41, while the voltage of windings 25 remains substantially constant because of the saturation of transformers 26. A resistor 28 may be connected across each capacitor 27 to adjust the slope of this portion of curve 41. Since the voltage of each secondary winding 29 is directly proportional to the voltage of its associated primary winding 25, curve 42 may be considered as proportionally representing the voltage of secondary windings 29 as well as primary windings 25.

Curve 43, obtained by subtracting the ordinates of curve 41 from those of curve 42, represents the differential voltage applied to field winding 15 by the regulator at varying values of the voltage of machine 3.

Curve 58 in Fig. 3 represents the variation of the rectified voltage proportional to the voltage of capacitor 51 which is impressed on resistor 57 in the circuit of field winding 15, in function of the variation of the current in conductors 4, 5, 6. At normal values of line current, the voltage across capacitor 51 is substantially zero, as shown by the lower portion of curve 58. However, at a critical value of the current in conductors 4, 5 and 6, the nonlinear resonant circuit comprising reactor 49 and capacitor 51 becomes resonant and the voltage across capacitor 51 increases abruptly, as shown by the steep portion of curve 58. A resistor 59 may be connected across capacitor 51 to adjust the slope of this portion of curve 58.

In operation, with machine 3 connected to load conductors 4, 5 and 6 as shown and with a current below the critical value being supplied under normal conditions, the circuit elements are so adjusted that when the voltage of machine 3 has the desired value, the cores of transformers 26 become saturated during parts of the voltage cycle and the voltage of field winding 15 is represented by a given point 40 on curve 43.

If for any reason the voltage of machine 3 decreases below the normal value, the periods of saturation of the cores of transformers 26 become shorter and the voltages of capacitors 27 decrease much more than the voltages of windings 25 and windings 29. Such action increases the difference between the voltages of resistors 34 and 37 and thereby increases the differential voltage applied to field winding 15 to increase the output voltage of exciter 14. Exciter 14 thereby causes an increase in the excitation of field winding 7 of machine 3 to prevent the voltage of machine 3 from dropping materially below the normal value.

When the voltage of machine 3 increases above the normal value, the periods of saturation of the cores of transformers 26 become longer and the voltages of capacitors 27 increases much more than the voltages of windings 25 and windings 29, thereby decreasing or even reversing the voltage applied to field winding 15, to prevent the output voltage of machine 3 from materially exceeding the desired value.

If the flow of current in conductors 4, 5 and 6 remains below the critical value, the nonlinear resonant circuit comprising reactor 49 and capacitor 51 does not become resonant and the voltage across capacitor 51 is substantially zero. Therefore, the voltage proportional to the voltage of capacitor 51 which is impressed on field winding 15 through rectifier 56 and resistor 57 is substantially zero and has a negligible effect upon winding 15.

However, if the flow of load current in conductors 4, 5 and 6 reaches the critical value for any reason, the core of reactor 49 becomes saturated during part of the voltage cycle and the nonlinear circuit comprising reactor 49 and capacitor 51 becomes resonant. As the current increases above the critical value, resonance between reactor 49 and capacitor 51 takes place during an abruptly increasing portion of the voltage cycle. Such resonance abruptly increases the voltage of capacitor 51 and thereby applies a substantial voltage to resistor 57 through rectifier 56. Owing to the connections of rectifier 56, the voltage of resistor 57 is of a polarity to oppose energization of field winding 15 by a control voltage of a polarity tending to increase the excitation of machine 3, thereby limiting the excitation of machine 3 to substantially prevent the current in conductors 4, 5 and 6 from exceeding the critical value. The critical value of current in conductors 4, 5 and 6 can readily be adjusted by varying the adjustable tap of resistor 54.

The regulator illustrated is especially adapted for use with a current limiting device because the maximum amplitude of the control voltage which may be applied to winding 15 in a direction tending to increase the excitation of machine 3 is limited, as shown by curve 43 of Fig. 2. Point 38 of Fig. 2 represents the maximum control voltage which can be applied to field winding 15 in a direction tending to increase the excitation of machine 3, regardless of the value of the voltage of machine 3. Therefore the current limiting device need only produce a voltage equal to the voltage represented by the ordinate of point 38 to reduce the excitation of field winding 15 to zero and thereby reduce the flow of current in conductors 4, 5 and 6. From the slope of the steep portion of curve 58 it will be apparent that the voltage across capacitor 51 increases very rapidly when the critical flow of current in conductors 4, 5 and 6 is exceeded, causing a rapid decrease in the excitation of machine 3 and quickly limiting the current in the load circuit.

Although but one embodiment of the invention has been shown and described, it will be apparent to those skilled in the art that various modifications may be made therein without departing from the spirit of the invention or from the scope of the appended claims.

It is claimed and desired to secure by Letters Patent:

1. In a regulating system for maintaining an electric quantity of an electrical system substantially constant, the combination of means responsive to variations in said electric quantity from a predetermined value for producing a reversible control voltage having a polarity dependent upon the direction of said variations, a nonlinear resonant circuit energized by a voltage which is a measure of the current in said electrical system and which is substantially independent of said electric quantity, said nonlinear circuit comprising a saturable reactor connected in series with a capacitor for producing a voltage across said capacitor which varies abruptly at a critical value of said current, means including rectifier means for producing a rectified voltage proportional to said capacitor voltage, and means responsive to said control voltage and said rectified voltage for controlling said electric quantity.

2. In a regulating system for a dynamoelectric machine connected to a load circuit, the combination of means responsive to variations in the output voltage of said dynamoelectric machine from a predetermined value for producing a reversible control voltage having a polarity and magnitude dependent upon the direction and magnitude of said variations, a nonlinear resonant circuit energized by a measure of the current in said load circuit substantially independently of said output voltage, said nonlinear circuit comprising a saturable reactor connected in series with a capacitor to produce across said capacitor a voltage which increases abruptly at a critical value of said current, means for producing a rectified voltage proportional to said capacitor voltage, and control means responsive to said control voltage and said rectified voltage for controlling the excitation of said dynamoelectric machine, said control means comprising a circuit on which said control voltage and said rectified voltage are impressed with said rectified voltage of a polarity to oppose said control voltage when said control voltage is of a polarity to increase the excitation of said dynamoelectric machine, thereby limiting the excitation of said dynamoelectric machine to prevent the current in said load circuit from increasing substantially above said critical value.

3. In a regulating system for a dynamoelectric machine connected to a load circuit, the combination of means for supplying excitation to said dynamoelectric machine, means responsive to variations in the output voltage of said dynamoelectric machine from a predetermined value for producing a reversible control voltage having a polarity and magnitude dependent upon the direction and magnitude of said variations, a nonlinear resonant circuit energized by a measure of the current in said load circuit substantially independently of said output voltage, said nonlinear circuit comprising a saturable reactor connected in series with a capacitor to produce across said capacitor a voltage which increases abruptly at a critical value of said current, means for producing a rectified voltage proportional to the voltage of said capacitor, and control means responsive to said control voltage and said rectified voltage for adjusting the excitation of said dynamoelectric machine, said rectified voltage being of a polarity to decrease the excitation of said dynamoelectric machine to prevent the flow of current in said load circuit from materially exceeding said critical value.

4. In a regulating system for a dynamoelectric machine connected to a load circuit, the combination of means responsive to variations in the output voltage of said dynamoelectric machine from a predetermined value for producing a reversible control voltage having a polarity and magnitude dependent upon the direction and magnitude of said variations, field winding means responsive to said control voltage for controlling the excitation of said dynamoelectric machine, a nonlinear resonant circuit energized by a measure of the current in said load circuit substantially independently of said output voltage, said nonlinear resonant circuit comprising a capacitor and a saturable reactor connected in series to produce across said capacitor a voltage which increases abruptly at a critical value of the current in said load circuit, means for producing a rectified voltage proportional to said capacitor voltage, and means for applying said rectified voltage to said field winding means in a direction opposing a predetermined directional energization of said field widing means by said control voltage to thereby limit the excitation of said dynamoelectric machine and prevent the current in said load circuit from materially exceeding said critical value.

5. In a regulating system for maintaining an electric quantity of a load circuit substantially constant, the combination of a first nonlinear resonant circuit disposed to be energized by a measure of said electric quantity for producing a reversible control voltage having a polarity and magnitude dependent upon the direction and magnitude of variations in said quantity from a predetermined value, control means responsive to said control voltage for controlling said electric quantity, a second nonlinear resonant circuit energized by a measure of the current in said load circuit substantially independently of said electric quantity, said nonlinear circuit comprising a capacitor and a saturable reactor connected in series to produce across said capacitor a voltage which increases abruptly at a critical value of said current, means for producing a rectified voltage proportional to the voltage of said capacitor, and means for applying said rectified voltage to said control means in a direction tending to reduce the current in said load circuit to prevent the current in said load circuit from materially exceeding said critical value.

6. In a regulating system for a dynamoelectric machine connected to a load circuit, the combination of means responsive to variations in the output voltage of said machine from a predetermined value for producing a reversible control voltage having a polarity and magnitude dependent upon the direction and magnitude of said variations, field winding means responsive to said control voltage for adjusting the excitation of said machine, means for limiting the amplitude of said control voltage of a predetermined polarity to increase the excitation of said machine, a nonlinear resonant circuit energized by a measure of the current in said load circuit substantially independently of said output voltage, said nonlinear circuit comprising a capacitor and a saturable reactor connected in series to produce across said capacitor a voltage which increases abruptly at a critical value of said current, means for producing a rectified voltage proportional to the voltage of said capacitor, and means for impressing said rectified voltage on said field winding means in a direction opposing said control voltage of predetermined polarity to limit the excitation of said machine to substantially prevent said current from exceeding said critical value.

7. In a regulating system for a dynamoelectric machine connected to a load circuit, the combination of a first nonlinear resonant circuit energized by a measure of the output voltage of said machine for producing a reversible control voltage having a polarity and magnitude dependent upon the direction and magnitude of variations in said output voltage from a predetermined value, field winding means responsive to said control voltage for adjusting the excitation of said machine, means for limiting the amplitude of said control voltage of a predetermined polarity tending to increase the excitation of said machine, a second nonlinear resonant circuit energized by a measure of the current in said load circuit substantially independently of said output voltage, said second nonlinear circuit comprising a capacitor and a saturable reactor connected in series to produce across said capacitor a voltage which increases abruptly at a critical value of said current, means for producing a rectified voltage proportional to the voltage of said capacitor, and means for impressing said rectified voltage on said field winding means in a direction opposing said control voltage of said predetermined polarity to limit the excitation of said machine to substantially prevent said current from exceeding said control value.

DANIEL J. SIKORRA.

REFERENCES CITED

The following references are of record in the file of this patent:

UNITED STATES PATENTS

| Number | Name | Date |
| --- | --- | --- |
| 2,179,623 | Godsey | Nov. 14, 1939 |
| 2,443,300 | Carter | June 15, 1948 |